United States Patent [19]

Ikenoya

[11] Patent Number: 4,493,677
[45] Date of Patent: Jan. 15, 1985

[54] BELT TRANSMISSION HAVING CIRCULATED AIR COOLING FUNCTION

[75] Inventor: Yasuo Ikenoya, Kawagoe, Japan

[73] Assignee: Honda Motor Co., Ltd., Tokyo, Japan

[21] Appl. No.: 454,455

[22] Filed: Dec. 29, 1982

[30] Foreign Application Priority Data

Dec. 29, 1981 [JP] Japan .......................... 56-194809[U]
Dec. 29, 1981 [JP] Japan .......................... 56-194812[U]
Dec. 29, 1981 [JP] Japan .......................... 56-194813[U]
Feb. 25, 1982 [JP] Japan ................................. 57-29329
Mar. 1, 1982 [JP] Japan ........................... 57-28618[U]

[51] Int. Cl.³ ............................................. F16H 57/04
[52] U.S. Cl. .................................... 474/93; 474/150; 74/606 A
[58] Field of Search ................ 474/93, 150, 185, 144, 474/188, 249; 192/113 A, 105 BA; 74/606 A

[56] References Cited

U.S. PATENT DOCUMENTS 2,205,975  6/1940  Heyer .............................. 474/93 X
2,230,575  2/1941  Myers ................................. 474/93
3,467,177  9/1969  Hoddinott ........................ 474/93 X
4,029,187  6/1977  Davis et al. .................. 192/105 BA Primary Examiner—Stephen J. Novosad
Assistant Examiner—Thuy M. Bui
Attorney, Agent, or Firm—Arthur L. Lessler

[57] ABSTRACT

A cooling fan is provided on at least one of the drive pulley and the driven pulley on which the drive belt is wound. A substantially closed casing in which the pulleys and the belt are accommodated has its interior partitioned in two chambers. With rotation of the fan, the air inside the casing is circulated within the casing where one of the chambers acts as a going passage and the other as a return passage, respectively, to thereby cool the pulleys and the belt. The two chambers are communicated with each other by communication means which are arranged at the pulleys and adapted to allow smooth movement of the air through the pulleys. Further provided are means for enhancing the efficiency of cooling the driven pulley by the circulating air and means for radiating heat generated within the casing through the casing walls.

17 Claims, 12 Drawing Figures

BELT TRANSMISSION HAVING CIRCULATED AIR COOLING FUNCTION

BACKGROUND OF THE INVENTION

This invention relates to a belt transmission such as an automatic belt transmission for motorcycles or other vehicles, and more particularly to cooling arrangements for cooling the component parts of such power transmission.

In motorcycles equipped with small output engines where small torque is transmitted to the driving wheel, a drive belt, which is made of rubber as a base material, is used to transmit rotation of the crankshaft of the engine to the driving wheel. An automatic belt transmission, which uses such drive belt, is generally employed to change the engine speed. A typical automatic belt transmission is adapted to steplessly change the speed ratio between a drive pulley on the crankshaft side and a driven pulley on the driving wheel side in such a manner that the drive pulley has its pitch diameter automatically changed due to centrifugal force which is generated by rotation of the crankshaft, and the change of the pitch diameter causes a corresponding change in the tension of a belt wound on the pulleys, which in turn causes a change in the pitch diameter of the driven pulley.

The above automatic belt transmission is rather simple in construction and can nevertheless perform transmission in a stepless manner. Therefore, it is very advantageous to apply such automatic belt transmissions to vehicles such as motorcycles, which are required to be compact in size and inexpensive, and also have a wide working speed range.

However, according to the above type automatic belt transmission, the transmission efficiency of power from the engine to the driving wheel is determined by the product of the coefficient of friction of the belt and the urging force of the belt against the pulleys. Consequently, if the urging force of the belt against the pulleys is set to a large value in order to obtain large transmission efficiency of power, a great deal of friction heat can be generated at the contacting portions of the belt and the pulleys, to cause overheating of the belt. Thus, the automatic belt transmission has limited maximum transmission efficiency of power, which imposes large limitations upon the output and total stroke volume of an engine to be installed on a vehicle to which is applied the automatic belt transmission.

Furthermore, the transmission mechanism is accommodated within an enclosed casing in a manner isolated from the outside, so as to avoid intrusion of dust, mud, water, etc. into the casing for protection of the transmission mechanism. This arrangement can cause a rise in the temperature inside the casing in cooperation with the generated friction heat to promote the overheating of the belt, which can result in a shortened service life of the rubber base belt.

SUMMARY OF THE INVENTION

It is a primary object of the invention to provide a belt transmission which is provided with a cooling device adapted to forcedly circulate air within the transmission casing so as to cause effective conduction of frictional heat generated between the belt and the pulleys to the casing walls, thereby achieving a high degree of heat radiation to the outside and consequently a longer effective life of the belt as well as a higher power transmission efficiency as compared with a conventional belt transmission.

It is a further object of the invention to provide a belt transmission which is arranged such that air is circulated within the casing at sufficient velocity and flow rate for effective heat change between the circulating air and the casing walls as well as effective cooling of the belt with air cooled by the above heat exchange.

It is another object of the invention to provide a belt transmission which is arranged such that air travels through the driven pulley and, if required, also through a centrifugal clutch located adjacent the driven pulley, always at a high rate irrespective of changes in the rotational speed of the pulley, to achieve an enhanced degree of heat radiation from these parts.

It is a still further object of the invention to provide a belt transmission in which the casing walls have inner surfaces and/or outer surfaces formed with fins for effective heat collection and/or heat radiation.

The above and other obujects, features and advantages of the the invention will be more apparent from the ensuing detailed description taken in connection with the accompanying drawings:

DETAILEO DESCRIPTION

The invention will now be described in detail with reference to the accompanying drawings wherein an embodiment of the invention is illustrated.

Figure 1:
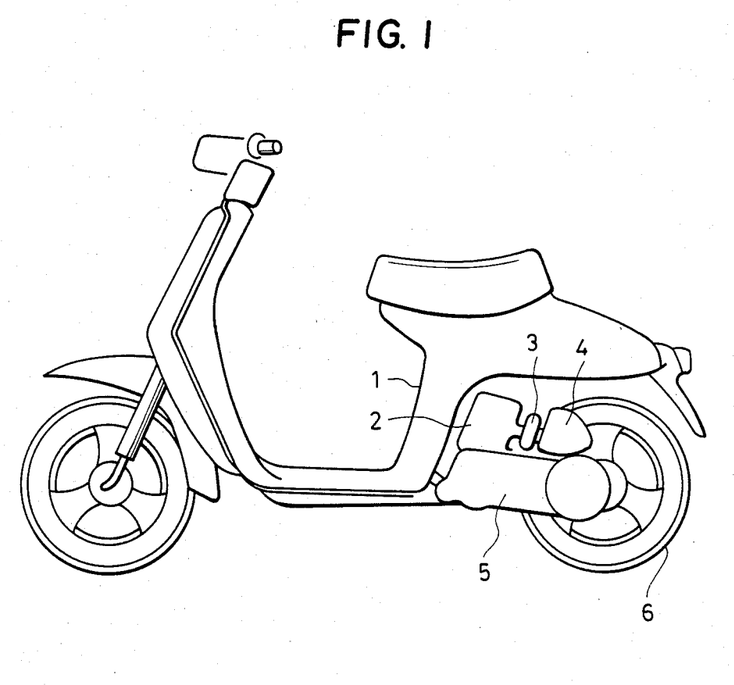
FIG. 1 is a schematic side view illustrating a motorcycle equipped with an automatic belt transmission to which the present invention is applied.

Referring first to FIG. 1, there is illustrated a motorcycle equipped with an automatic belt transmission to which the invention is applied. Reference numeral 1 designates a body of the motorcycle which carries an engine 2, and also a carburetor 3 and an air cleaner 4 arranged rearwardly of the engine 2. The body 1 further carries a transmission casing at its left side in which a belt transmission mechanism is accommodated, which transmits rotation of the engine 2 to a rear or driving wheel 6, with an automatic speed changing function. The casing 6 is joined integrally to the engine assembly as described later, and the engine assembly has its front end portion movably suspended from the frame of the body 1 by means of a hanger member, not shown, which is pivotably connected between the body frame and the engine assembly, while it also has its rear end portion movably suspended from the body frame by means of a rear cushion 35, shown in FIG. 2, to thus restrain transmission of vibrations of the engine 2 during operation.

Figure 2:
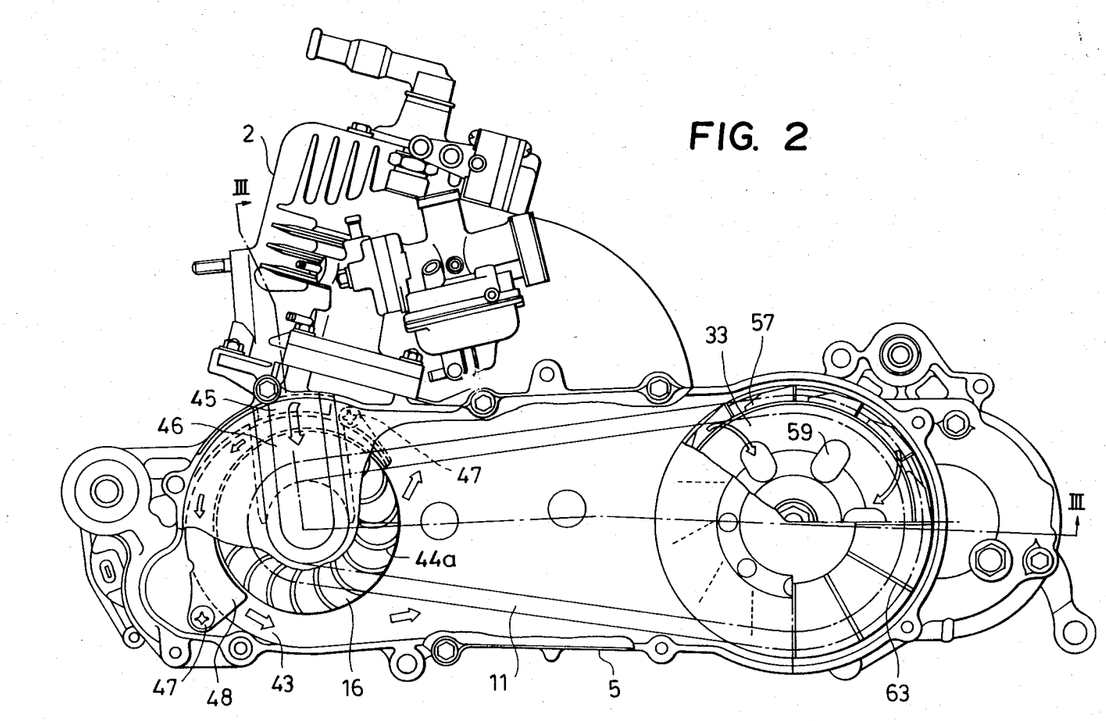
FIG. 2 is a side view, partly broken away, of an automatic belt transmission according to an to an embodiment of the invention.
Figure 3:
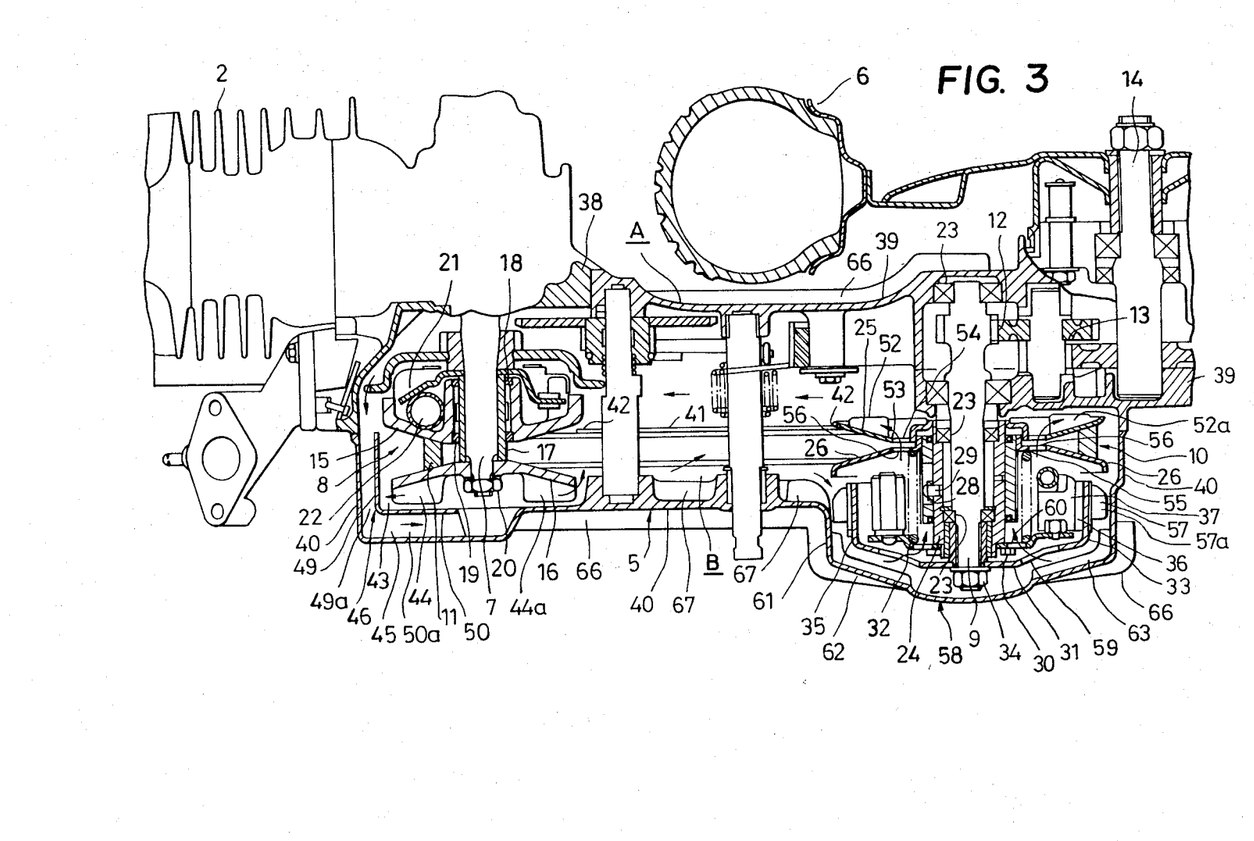
FIG. 3 is a horizontal sectional view taken along line III—III in FIG. 2 and illustrating the interior construction of the automatic belt transmission of FIG. 2.

The transmission mechanism, which belongs to the prior art, per se, is illustrated in FIGS. 2 and 3. A drive pulley 8 is mounted on a crankshaft 7 of the engine 2 projected into the transmission casing 5 at a front location, while a driven pulley 10 is mounted on a driven shaft 9 at a rear location and arranged to transmit its rotation to the driving rear wheel 6. A driving belt 11, which is formed of a V-belt and made of rubber as a principal material, is wound over the pulleys to transmit rotation of the engine 2 to the driven shaft 9. The driven shaft 9 meshes with reduction gears 12 and 13 arranged in a transmission cover 39 engaging with a final shaft 14 to transmit rotation of the engine 2 to the driving wheel 6 through these parts.

The drive pulley 8 comprises a movable drive face element 15 and a stationary drive face element 16, both made of a highly heat conductive material such as aluminum. The movable drive face 15 is fitted via oil seals 18 and 19 on a collar 17 fitted on the crankshaft 7 and is axially slidably movable on collar 17. The stationary drive face element 16 is fitted on tip of the crankshaft 7 and secured thereto by means of a nut 20 screwed on the shaft tip.

A ramp plate 21 is secured on the crankshaft 7 and disposed opposite the movable drive face element 15, with a weight roller 22 interposed between the ramp plate 21 and the drive face element 15. The ramp plate 21 and the movable drive face element 15 are configurated such that the gap between them gradually decreases toward their outer peripheral edges. Therefore, as the weight roller 22 radially outwardly moves due to its own centrifugal force produced by rotation of the crankshaft 7, the movable drive face element 15 is urgedly axially moved by the weight roller 22 toward the stationary drive face element 16 to thus determine the gap between the two drive face elements 15 and 16, dependent upon the rotational speed of the crankshaft 7. This gap determines the pitch diameter of the drive pulley 8, that is, the distance between the inner peripheral surface of an associated turning portion of a belt 11 interposedly wound around the drive face elements 15 and 16 and the diametric center of the drive pulley 8, i.e. of the crankshaft 7. In this manner, the pitch diameter of the drive pulley 8 varies in response to the rotational speed of the engine 5.

Figure 4:
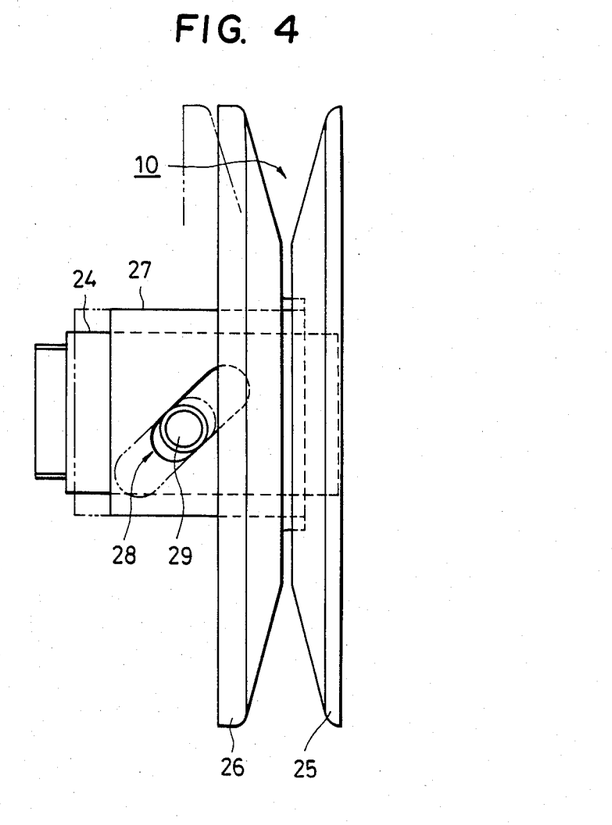
FIG. 4 is a side view of the driven pulley.

On the other hand, the driven pulley 10 comprises as principal components a stationary driven face element 25 welded on an end of a sleeve-shaped boss 24 rotatably fitted on the driven shaft 9 via bearings 23 and 23, and a movable driven face element 26 axially slidably fitted on the boss 24. As shown in FIG. 4, the stationary driven face element 25 has a boss 27 rotatably fitted on the boss 24 and formed in its peripheral surface with an elongate camming slot 28 extending obliquely with respect to the axis of the driven shaft 9 at a predetermined angle (approximately 45 degrees). A pin 29, which is secured on the driven face boss 24, is movably engaged in this camming slot 28 so that the movable driven face element 26 is circumferentially displaced as it axially moves on the driven shaft 9. The movable driven face element 26 is permanently urgedly biased toward the stationary driven face element 25 by a coil spring 32 interposed between the driven face element 26 and a clutch plate 31 forming part of a centrifugal clutch and secured on the other end of the boss 24 by a nut 30. Thus, the movable driven face element 26 is positioned at a location where the tension of the belt 11 and the force of the spring 32 balance each other, to determine the gap between the two driven face elements 25 and 26.

A clutch outer element 33 having a generally U-shaped cross section, which forms part of the centrifugal clutch, is secured on tip of the driven shaft 9 by a nut 34 screwed on the shaft 9. A clutch body or weight 37 is mounted on the aforementioned clutch plate 31, which carries a clutch shoe 36 disposed in facing relation to an inner surface of a cylindrical peripheral lateral portion 35 of the clutch outer element 33. When the rotational speed of the driven pulley 10 exceeds a predetermined speed, the clutch shoe 36 on the radially outwardly moving clutch body 37 comes into frictional contact with the inner surface of the peripheral lateral portion 35 of clutch outer element 33 to transmit the rotation of the driven pulley 10 to the driven shaft 9.

Next, the air cooling arrangement according to the invention will now be described.

The transmission casing has a substantially closed structure and is formed by part of a crankcase 38 of the engine 2, part of the transmission cover 39 arranged adjacent the crankcase 38, and an exclusive cover 40 joined in an abutting manner to the crankcase 38 and the transmission cover 39. A partitioning packing 41 is interposed between the crankcase 38 and the transmission cover 39 and the exclusive cover 40 along their joint. The partitioning packing 41 extends along and parallel with the belt 11 to divide the interior of the casing 5 in a chamber B on the crankcase side and a chamber A on the transmission cover side. The partitioning packing 41 also keeps the above joint airtight. The drive pulley 8 and the driven pulley 10 are each located in both of the chambers A and B at opposite end portions of same. The packing 41 is formed with through holes 42 and 42 at portions facing the pulleys 8 and 10, through which the pulleys extend.

A spiral chamber 43 is defined between an inner peripheral surface of the casing 5 surrounding a front half peripheral portion of the drive pulley 8 and the same front half peripheral portion, particularly a fan 44, hereinlater referred to, on the drive face element 16, as best shown in FIG. 2. This spiral chamber 43 spirally extends about the axis of the crankshaft 7 with its volume gradually increasing in the rotating direction of the drive pulley 8, that is, in the advancing direction of air blown by the revolving fan 44.

The drive face element 16 of the drive pulley 8, which is located in the chamber B, has its outer side surface formed with a plurality of vanes 44a forming the above fan 44 and circumferentially arranged. These vanes 44a each have a concave face directed in their revolving direction and are located close to the inner surface of the cover 40.

Figure 9:
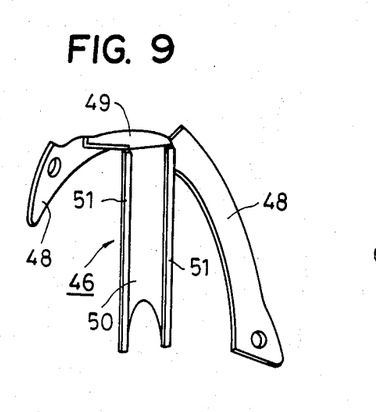
FIG. 9 is a perspective view illustrating a communication passage member.
Figure 10:
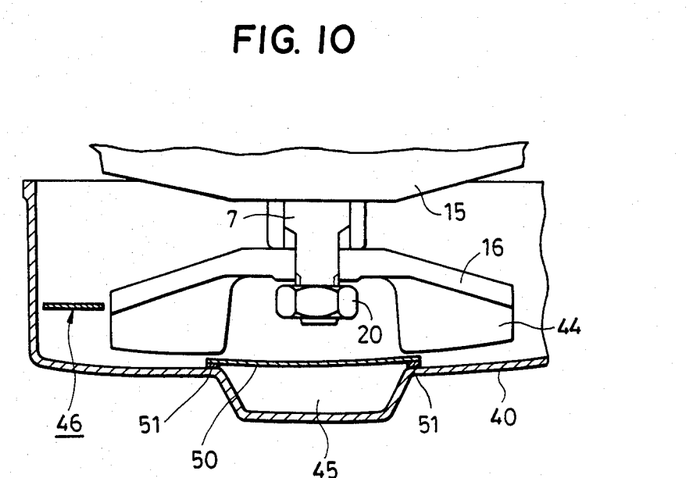
FIG. 10 is a horizontal sectional view illustrating the communication passage member mounted in the transmission casing at the drive pulley.

A communication passage 45 extends from the chamber A to the chamber B. That is, it starts from the chamber A and extends along the outer periphery of the drive pulley 8 and the outer side surface of the drive face element 16 and terminates in a central portion of the drive face element 16 at which is located the free end of the drive shaft 7. At the above central portion of the drive face element 16, the communication passage 45 communicates with the above spiral chamber 43. The communication passage 45 is formed of a passage member 46 shown in FIG. 9. That is, the passage member 46 is formed by a one-piece sheet member comprising an arcuate fitting foot portion 48 fixed to bosses, not shown, on the casing wall 40 by means of screws 47 and 47, a passage surface portion 49 continuously extending from the foot portion 48 at right angles thereto and defining a first passage portion 49a in cooperation with the peripheral wall or cover 40 of the casing 5, and a guide surface portion 50 continuously downwardly extending from the terminating end of the passage surface portion 49 toward the central portion of the drive face element 16 and defining a second passage portion 50a continuous with the first passage portion 49a in cooperation with the peripheral wall 40. The above guide surface portion 50 is disposed to extend along a lateral side of the drive pulley 8 and axially thereof, and has a pair of shock-absorbing rubber linings 51 and 51 applied on its opposite outer surface edges and disposed in contact with an inner surface of the cover 40 for preventing resonance between the drive pulley 8 and the casing 5. The guide surface portion 50 is disposed to extend along an end face of the drive pulley 8 and radially thereof, i.e. along the outer side surface of the drive face element 16. The guide surface has its lower end edge concavely notched so as to disperse air toward the drive pulley 8. By providing the above communication passage 45, the chambers A and B communicate with each other through the first and second passage portions 49a and 50a, and air travelling from the chamber A to the chamber B flows into the drive pulley 8 through the central portion of the drive face element 16 and then blown in the radially outward directions by the fan 44 on the drive face element 16.

Figure 5:
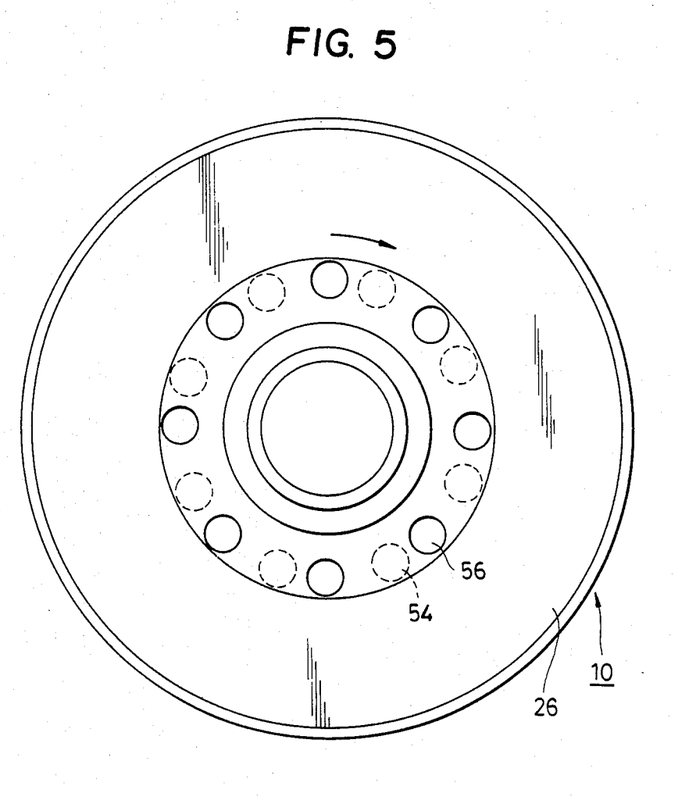
FIG. 5 is an end view illustrating the same driven pulley.
Figure 6:
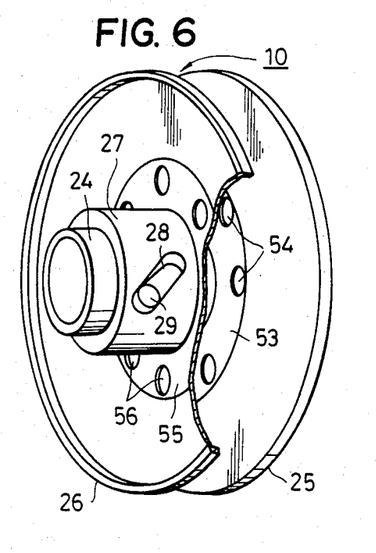
FIG. 6 is a perspective view illustrating the driven pulley rotating at a low speed.
Figure 7:
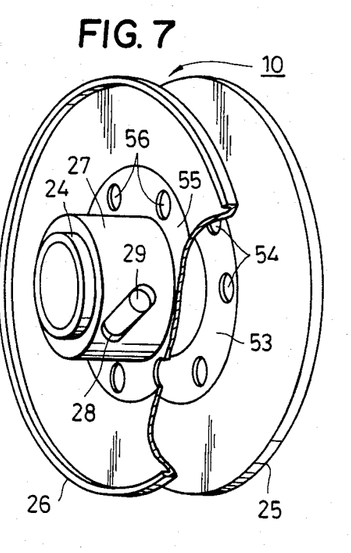
FIG. 7 is a view similar to FIG. 6, illustrating the driven pulley rotating at a high speed.

On the other hand, at the driven pulley 10, a plurality of vanes 52a, which forms a fan 52, are secured in a circumferential arrangement on an outer peripheral surface of the stationary driven face element 25 which is located in the chamber A. The driven face element 25 has a radially extending central flat portion 53 formed with a plurality of axial through holes 54 arranged circumferentially of the axis of the driven shaft 9 at equal intervals, as clearly shown in FIGS. 5 through 7. Also, the movable driven face element 26 has a radially extending central flat portion 55 opposite the above portion 53 formed with a plurality of axial through holes 56 arranged circumferentially of the driven shaft 9 at equal intervals. The positional relationship between the through holes 54 and 56 is such that each of the through holes 56 becomes axially aligned with a corresponding one of the through holes 55 when the movable driven face element 26 becomes close to the stationary driven face element 25 at a minimum distance by rotating relative thereto due to the engagement of the pin 29 in the camming slot 28 where the pitch diameter of the driven pulley 10 or the distance between the axis of the driven shaft 9 and the inner surface of an associated turning portion of the belt 11 has a maximum value, as shown in FIG. 6, and as the element 26 is moved away from the element 25, the paired through holes 54 and 56 is gradually circumferentially displaced away from each other, as in the position in FIG. 7.

Figure 8:
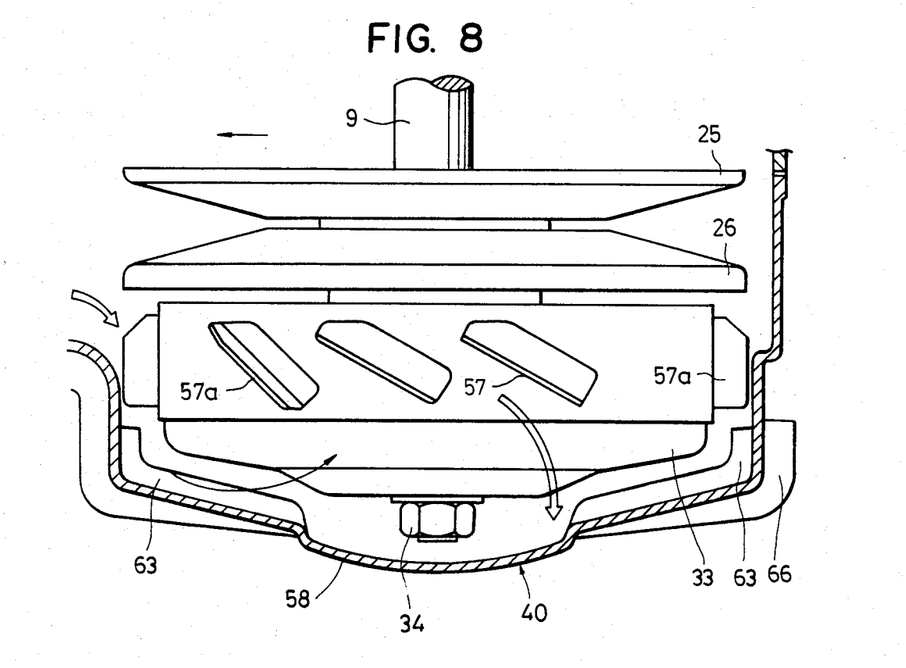
FIG. 8 is a plan view, partly in section, showing the positional relationship between a centrifugal clutch provided integrally with the driven pulley and the transmission casing.

As shown in FIGS. 2 and 8, a plurality of vanes 57a forming a fan 57 are secured and circumferentially arranged on an outer side surface of the peripheral lateral portion 35 of the clutch outer element 33, which are formed of stamped metal plates and welded to the element 33. These vanes are each directed obliquely at a predetermined angle with respect to the axis of the driven shaft 9 so as to blow air in a predetermined circumferential direction. These vanes 57a of the fan 57 have their top edges located close to the inner surface of a peripheral lateral wall 61 of a clutch outer housing portion 58 of the cover 40 which has a swelled configuration corresponding to the outer shape of the clutch outer element 33. As shown in FIG. 2, the clutch outer element 33 is formed with a plurality of axial through holes 59 opening in its opposite side surfaces and arranged circumferentially of the axis of the driven shaft, while the clutch plate 31 is also formed with a plurality of axial through holes 60 circumferentially extending at locations corresponding to the above through holes 59. Thus, a flow passage is provided which extends from the gap between the swelled portion 58 of the cover 40 and the clutch outer element 33 and then through the through holes 59 and 60 and the interior of the centrifugal clutch and around the boss 24 of the driven pulley 10 and leads to the chamber A through the through holes 54 and 56 formed in the driven face elements 25 and 26 of the driven pulley 10.

Figure 11:
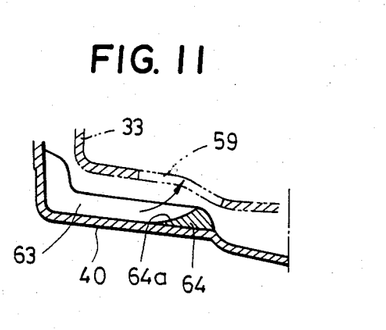
FIG. 11 is a fragmentary sectional view illustrating a modification of a guide fin appearing in FIG. 3.

A plurality of heat collecting guide fins 63 are formed in rows on inner surfaces of the cover 40, which horizontally extend parallel with each other from the peripheral lateral wall 61 of the swelled portion 58 to the end wall 62. These fins 63 each have one end facing the fan 57 on the peripheral lateral wall of the clutch outer element 33 and the other end the through holes 59 formed in the same element 33, so as to guide air toward the through holes 59. To promote this air guiding function, a further guide wall 64 may be provided, between two adjacent upper and lower guide fins 63 and 63, preferably formed integrally therewith, which vertically extends and has an arcuate surface 64a facing the through holes 59 so that air flows along this arcuate surface 64a just toward each through hole 59.

Figure 12:
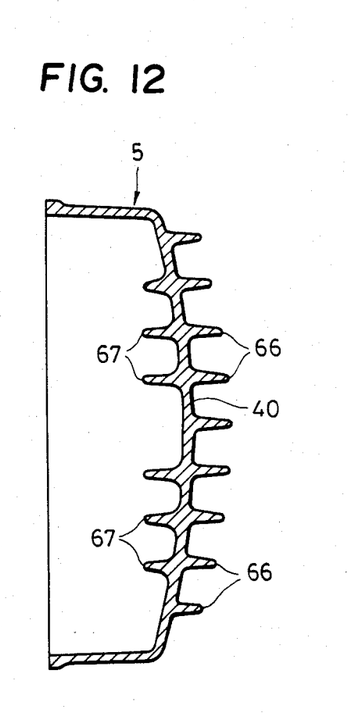
FIG. 12 is a sectional view, on an enlarged scale, of a wall portion of the transmission casing.

Further, as best shown in FIGS. 3 and 12, a plurality of heat radiating fins 66 are formed and arranged in rows on outer surfaces of the peripheral walls 39 and 40 of the casing 5, which are projected outwardly of the casing walls. Preferably, as in the illustrated embodiment, the heat radiating fins 66 horizontally linearly extend from a front end portion of the casing 5 to a rear end portion of same. On the other hand, as shown in FIGS. 3 and 12, a plurality of heat collecting fins 67 are formed in an inwardly projected manner on an inner surface of the peripheral wall 40 of the casing 5. Preferably, these heat collecting fins 67 horizontally linearly extend from a location immediately downstream in air flow of the driven pulley 8 to a location in the vicinity of the driven pulley 10.

The operation of the circulated air cooling arrangement described above will now be described: Heat generated at the contacting portion of the drive face element 16 with the belt 11 during rotation of the drive pulley 8 in unison with the crankshaft 7 of the engine 5 conducts to the drive face element 16 which is formed of aluminum having high heat conductivity and then is effectively radiated by circulating air from the surfaces of the vanes 44a of the fan having a large overall surface area, provided on the face element 16. The circulating air is delivered to a rear zone in the casing 5 by the rotating fan 44. The air first rearwardly travels in the chamber B defined between the partitioning packing 41 and the cover 40, while simultaneously it has its own heat conducting to the inner surface of the cover 40 for radiation to the outside. On this occasion, the heat collecting fins 67 formed on the inner surfaces of the cover 40, which impart an increased overall heat collecting surface area to the cover 40, effectively collect heat, while the heat radiating fins 66 formed on the outer surface of the cover 40, which impart an increased overall heat radiating surface area to the cover 40, effectively radiate heat to the atmosphere through the cover wall. Further, during the travel in the chamber B, the air flows in touch with the belt 11 to conduct heat away from same. The air thus travelling in the chamber B is guided to the outer periphery of the clutch outer element 33 by the fan 57 on the peripheral lateral portion of the clutch outer element 33 and guided to the central portion of the swelled portion 58 of the cover 40 along the guide fins 63 formed on the inner surface of the same portion 58. As the air travels along the guide fins 63, it undergoes a flow rectifying action by the fins 63 and then is guided into the through holes 59 in the clutch outer element 33. Then, it passes through the through holes 60 in the clutch plate 31 to collide against the movable driven face element 26, thus cooling the component elements of the centrifugal clutch. The air is hence acted upon by centrifugal force produced by the rotating fan 52 to further travel through the through holes 54 and 56 in the movable driven face element 26 and the stationary driven face element 25 into the chamber A. At this instant, the air absorbs frictional heat generated at the contacting portion of the belt 11 with the driven face elements of the driven pulley 10 to prevent overheating of the above contacting portion. When passing through the through holes 54 and 56, the air always undergoes very small flow resistance, since the through holes 54 and 56 become axially aligned with each other when the driven pulley 10 has a minimum pitch diameter, as previously stated. To be concrete, when the driven pulley 10 has a minimum pitch diameter, that is, when the driving wheel 6 is rotating at a low speed, the through holes 54 and 56 become axially aligned with each other. Therefore, the air undergoes a very small drop in its flow rate in passing the through holes 54 and 56, despite a drop in the rotational speed of the fan 52 on the driven face element 25. On the other hand, when the driven pulley 10 has a maximum pitch diameter with the driving wheel and accordingly the fan 52 rotating at a high speed, the through holes 54 and 56 become axially offset with respect to each other. However, also on this occasion, the air passing the through holes 54 and 56 undergoes a very small drop in flow rate, since the fan 44 then rotates at a high speed. Therefore, after passing through the driven pulley 10, the air has a high travelling speed enough to collide against associated inner surfaces of the peripheral walls 39 and 40 of the casing 25 to have its heat radiated to the outside through these walls.

The air flowing into the chamber A further travels in the forward direction while having its own heat radiated in contact with the inner surface of the peripheral wall 39 of the casing 5. The air thus cooled reaches the communication passage 45 and is forcedly guided through the first and second passage portions 49a and 50a by the action of the fan 44 on the drive face element 16, into the chamber B, at the central portion of the drive pulley 8. Then, the air is blown radially outward due to centrifugal force produced by the fan 44 on the drive face element 16, into the spiral chamber 43 located around the drive face element 16. The air travels in the spiral chamber 43 without a drop in its velocity and flow rate due to the gradually increasing volume of the chamber 43 in the air flow direction, to be strongly blown against associated inner surfaces of the peripheral wall 40 of the casing 5 for effective heat radiation to the outside through the casing 5 and also widely distributed to various portions in the chamber B for prevention of overheating of the belt 11.

As stated above, the transmission casing according to the invention has its interior divided in the left and right chambers A, B by the partitioning packing 41 extending parallel with the belt 11 in the casing 5, where the circulating air is circulated in the casing with one of chambers serving as a going passage and the other as a return passage. By virtue of this arrangement, heat generated between the pulleys and the belt can be evenly brought into contact with the peripheral walls of the casing 5 for effective heat radiation to the outside through the casing 5, thus achieving a highly efficient air cooling function even with the airtight casing. Thus, the belt 11 can never be overheated and can have a much longer effective life as compared with a conventional belt transmission.

Although in the illustrated embodiment the belt transmission according to the invention is applied to an automatic belt transmission, the invention is not limited to an automatic type, but of course may be applied to any other type belt transmission.

While the invention has been described in its preferred embodiment, obviously modifications and variations will occur to those skilled in the art within the scope of the present inventive concepts which are delineated by the following claims.

What is claimed is:

1. A belt transmission comprising: a drive pulley; a driven pulley; a belt engaging with said drive pulley and said driven pulley; a casing accommodating said drive pulley, said driven pulley and said belt; fan means provided on at least one of said drive pulley and said driven pulley for rotation in unison therewith; means partitioning the interior of said casing into a first chamber and a second chamber, said first and second chambers extending at least between said drive pulley and said driven pulley; and means communicating said first chamber and said second chamber with each other; said fan means, said partitioning means and said communication means being arranged such that rotation of said fan means causes a gas in said casing to be circulated in said casing through said first and second chambers to effect heat exchange with said drive pulley, said driven pulley, said fan means and said belt, whereby one of said first and said second chamber serves as going passage, and the other as a return passage, respectively.

2. The belt transmission as claimed in claim 1, wherein said partitioning means comprises a partitioning member extending along and parallel with said belt.

3. The belt transmission as claimed in claim 2, wherein said casing comprises a peripheral wall portion disposed around an outer periphery of said drive pulley, and a spiral chamber defined between said peripheral wall portion and said outer periphery of said drive pulley at a location within one of said first and second chambers, said spiral chamber gradually increasing in volume in a rotating direction of said drive pulley, said communication means including a communication passage extending from the other of said first and second chambers and leading to said spiral chamber, whereby said first chamber and said second chamber communicate with each other through said spiral chamber and said communication passage.

4. The belt transmission as claimed in claim 3, wherein said communication passage comprises at least one member having a first surface portion extending along a lateral side of said drive pulley and axially thereof, and a second surface portion extending continuously from said first surface portion and along an end face of said drive pulley and radially thereof, said first surface portion defining a first passage portion extending from said one of said first and second chambers and between same and an associated surface of said peripheral wall portion of said casing, said second surface portion defining a second passage portion extending continuously from said first passage portion and between same and an associated surface of said peripheral wall portion of said casing and leading to the other of said first and second chambers.

5. The belt transmission as claimed in claim 2, wherein said driven pulley comprises a pair of driven face elements disposed in relation concentric and opposite to each other and carrying said belt wound thereon, said communcation means including at least one through hole formed in each of said driven face elements and opening in opposite side surfaces thereof.

6. The belt transmission as claimed in claim 5, wherein one of said driven face elements is axially movable relative to the other driven face element, said through hole being disposed to be located radially inwardly of an inner peripheral surface of said belt even when said one driven face element is located at a maximum distance from the other driven face element.

7. The belt transmission as claimed in claim 5, wherein said driven face element further includes means responsive to axial movement of said one driven face element for varying the circumferential phase of said one driven face element with respect to the other driven face element, said phase varying means being adapted to drive said one driven face element so that said through hole in said one driven face element becomes axially aligned with said through hole in the other drive face element when said one driven face element becomes located at a minimum distance from the driven face element.

8. The belt transmission as claimed in claim 2, further including a centrifugal clutch responsive to rotational speed of said driven pulley for drivingly coupling said driven pulley to driven means to which rotational force is to be transmitted from said driven pulley, said driven pulley comprising a rotary shaft disposed for drivingly coupling to said driven means, and a pair of driven face elements arranged on said rotary shaft in relation concentric and opposite to each other and carrying said belt wound thereon, said driven face element being rotatable relative to said rotary shaft, said centrifugal clutch comprising a clutch plate disposed for rotation in unison with said driven face elements, a clutch outer element secured to said rotary shaft, and a weight supported by said clutch plate and responsive to rotational speed thereof for frictional engagement with and disengagement from said clutch outer element, said clutch plate and said clutch outer element each having at least one through hole opening in opposite side surfaces thereof, whereby said gas being circulated in said casing is guided into the interior of said centrifugal clutch through said through holes in said clutch plate and said clutch outer element to cool same.

9. The belt transmission as claimed in claim 8, wherein said driven face elements each have at least one through hole opening in opposite side surfaces thereof, whereby said gas being circulated in said casing is moved between said first chamber and said second chamber through said through holes in said clutch plate and clutch outer element of said centrifugal clutch and said through holes in said driven face elements.

10. The belt transmission as claimed in claim 8, further including a plurality of parallel fins formed in an inner surface of said casing opposite said clutch outer element of said centrifugal clutch, said parallel fins each having one end disposed opposite said through hole in said clutch outer element for guiding said gas being circulated in said casing to said last-mentioned through holes.

11. The belt transmission as claimed in claim 8, further including a wall extending between said one ends of two adjacent ones of said parallel fins, said wall having an arcuate surface directed toward said through hole in said clutch outer element.

12. The belt transmission as claimed in claim 1, wherein said fan means comprises a first fan provided on said drive pulley, and a second fan provided on said driven pulley.

13. The belt transmission as claimed in claim 12, wherein one of said first and second fans is arranged in said first chamber, and the other in said second chamber, respectively.

14. The belt transmission as claimed in claim 1, wherein said drive pulley comprises a first rotary shaft, a pair of drive face elements disposed concentrically and opposite each other and carrying said belt wound thereon, one of said drive face elements being axially movable relative to the other drive face element, and means responsive to changes in the rotational speed of said first rotary shaft for causing movement of said one drive face element relative to said other drive face element, and said driven pulley comprises a second rotary shaft, a pair of driven face elements disposed concentrically and opposite each other and carrying said belt wound thereon, one of said driven face elements being mounted on said second rotary shaft and the other drive face element being axially movable relative to said one driven face element, and means permanently urging said other driven face element toward said one driven face element.

15. The belt transmission as claimed in claim 1, further including a plurality of heat radiating fins formed on an outer peripheral surface of said casing.

16. The belt transmission as claimed in claim 1, further including a plurality of heat collecting fins formed on an inner peripheral surface of said casing.

17. The belt transmission as claimed in claim 1, further including a plurality of heat radiating fins formed on an outer peripheral surface of said casing and a plurality of heat collecting fins formed on an inner peripheral surface of said casing.

* * * * *